United States Patent
Li et al.

(10) Patent No.: US 7,676,480 B2
(45) Date of Patent: Mar. 9, 2010

(54) METHOD AND DEVICE FOR HANDLING METADATA

(75) Inventors: Hui Li, Hannover (DE); Meinolf Blawat, Hannover (DE); Wolfgang Klausberger, Hannover (DE); Stefan Kubsch, Hohnhorst (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 411 days.

(21) Appl. No.: 11/103,133

(22) Filed: Apr. 11, 2005

(65) Prior Publication Data
US 2006/0041524 A1 Feb. 23, 2006

(30) Foreign Application Priority Data
Apr. 15, 2004 (EP) .................. 04008934

(51) Int. Cl.
*G06F 17/30* (2006.01)
(52) U.S. Cl. .................. 707/101; 707/3; 707/102; 707/200
(58) Field of Classification Search .................. None
See application file for complete search history.

(56) References Cited

U.S. PATENT DOCUMENTS

| | | | | |
|---|---|---|---|---|
| 6,571,245 B2* | 5/2003 | Huang et al. | .................. | 707/10 |
| 6,938,042 B2* | 8/2005 | Aboulhosn et al. | ............ | 707/10 |
| 2002/0091665 A1 | 7/2002 | Beek et al. | | |
| 2002/0159519 A1 | 10/2002 | Tabatabai et al. | | |
| 2003/0110176 A1 | 6/2003 | Morgan et al. | | |
| 2003/0115219 A1 | 6/2003 | Chadwick | | |
| 2004/0230567 A1* | 11/2004 | Wookey | ........................ | 707/3 |

FOREIGN PATENT DOCUMENTS

| | | | |
|---|---|---|---|
| EP | 1 102 276 A | 5/2001 |
| EP | 1 317 143 A | 6/2003 |
| EP | 1 277 063 A | 1/2004 |
| EP | 1 387 295 A | 2/2004 |

OTHER PUBLICATIONS

Devlin B.: "MXF—The Materil Exchange Format" EBU Review Technical European Broadcasting Union, Geneva, CH, Jul. 2002 p. 1-7 XP002276057 ISSN: 1018-7391.
John G. S Ive: "The Material Exchange Format and the Workflow Revolution:" www.pro-mpeg.org Jul. 28, 2003, pp. 1-4, XP002296458.
Demystifing Audio Metadata: J. Audio Eng. Soc., vol. 51 No. 7/8, Jul. 2003, Aug. 2003 pp. 744-751, XP002296583.
Search Report.

* cited by examiner

*Primary Examiner*—Cam Y T Truong
(74) *Attorney, Agent, or Firm*—Robert D. Shedd; Harvey D. Fried; Joel M. Fogelson

(57) ABSTRACT

The handling of metadata being provided in different formats shall be simplified. Therefore, it is suggested to provide metadata in a first metadata structure having a first format and providing a second metadata structure having a first format and providing a second metadata structure having a second format, wherein link data are deposited in the second metadata structure. The link data point to metadata in the first metadata structure. Thus, it is possible to trealize synchronous and automatic editing of metadata and its mirror metadata.

4 Claims, 5 Drawing Sheets

METHOD AND DEVICE FOR HANDLING METADATA

This application claims the benefit, under 35 U.S.C. 119, of French patent application No. 04008934.4 filed Apr. 15, 2004.

FIELD OF THE INVENTION

The present invention relates to a method for handling metadata by providing metadata in a first metadata structure having a first format and providing a second metadata structure having a second format. Furthermore, the present invention relates to a corresponding device for handling metadata.

BACKGROUND OF THE INVENTION

Usually, metadata are stored in a local database in an individual format. Based on these database metadata, an essence may be found easily.

For data exchange among a plurality of applications, the Material exchange Format (MXF) as developed in the Pro-MPEG Forum (www.pro-mpeg.org.), is an format exemplary that can be used for such an exchange operation. The MXF data format has many advantages. An important advantage of the MXF is that is supports metadata functionality. This means that the MXF makes it possible to interchange or store essence user data together with their associated metadata.

When applying the MXF in a local computer system, metadata can exist both in a local metadata database and each MXF file. It is impossible to realize synchronously metadata editing for metadata in the local database and metadata in MXF files. Thus, the metadata provided in the two different formats have to be edited twice.

SUMMARY OF THE INVENTION

In view of that it is the object of the present invention to provide a method and a device for handling metadata which ensure simplified editing of the metadata.

An aspect of the present invention discloses a method for handling metadata by providing metadata in a first metadata having a first metadata structure in a a first format and providing a second metadata structure having a second format, and, furthermore, depositing link data in said second metadata structure, said link data pointing to said metadata in said first metadata structure.

Another aspect of the present invention discloses a device for handling metadata including first data providing means for providing metadata in a first metadata structure having a first format and second data providing means for providing a second metadata structure having a second format, as well as data processing means for depositing link data in said second metadata structure, said link data pointing to said metadata in said first metadata structure.

Disclosed embodiments of the present invention allow for generating, editing and searching of metadata by including reference messages in corresponding metadata of different formats. Thus, synchronous and automatic editing of metadata and its mirror metadata can be realized.

Preferably, the link data include a universal unique identifier. This identifier points to specific metadata, so that data of different formats may have access to these metadata.

The first format may be the standardized MXF format and the link data in other metadata may point to the unique identifier and associated metadata of an MXF file. Thus, any metadata provided in the MXF format can be used for individual applications.

The second format, an example of an exemplary format for use with the present invention, may be a multi-layer-format as defined in document EP 1 387 295 A12. Such multi-layer-format provides a metadata link space for storing linking information pointing to a unique identifier and associated metadata of an MXF file.

Alternatively, the first format is a multi-layer-format and the link data in other metadata are pointing to an identifier element in the multi-layer-format. In that way, metadata of an individual multi-layer-format may be accessed to. If in this case the second format is the standardized MXF format, the link data may be stored in the associated metadata of an MXF file.

In principle, the inventive method for automatically handling metadata includes the steps of retrieving from a first storage medium first data comprising first metadata and having a first format, retrieving from the first or a different second storage medium second data having a second format, detecting that the retrieved first data have been modified, extracting link information from the first metadata, wherein the extracted link information is a reference to said second data such as a UUID, and updating the second data referenced by said link information with the modified first metadata.

Further, also the second data may contain link information comprising first link information being a reference to said first data and second link information being a reference to said first metadata within said first data, and the method may further comprise the steps of detecting, before updating the retrieved second data, that the retrieved second data have been modified, determining whether the first data or the second data have been modified later, and if the second data have been modified later, then extracting said link information from the second data, and updating the first metadata referenced by said link information.

BRIEF DESCRIPTION OF THE DRAWINGS

Exemplary embodiments of the invention are described with reference to the attached drawings showing in.

DETAILED DESCRIPTION OF THE INVENTION

The following description of exemplary embodiments of the inventive method is based on the MXF standard format and a multi-layer-format, but the method can also be used for data according to any other standard format. In order to better understand the present invention, first of all the following paragraphs demonstrate the handling of metadata in the MXF format and a multi-layer-format according to the prior art.

The Material exchange Format (MXF) is a joint effort between major industry organizations. It is an open and standardized format, a file wrapper format, independent from application, platform and network and a metadata aware file format. MXF is said to be the first standardized data format, which can pack essence with its associated metadata together. That is the very reason that many companies want to use this format.

When a user according to prior art transfers local essence into an MXF file, some database metadata associated to the essence will be packed together into the MXF file. The database metadata model or structure will be converted into an appropriate MXF metadata model. In this case, the MXF metadata is a kind of mirror metadata of the database metadata.

In another scenario, before the user stores a received MXF file into an own repository, the user may convert some significant MXF metadata into the model of local database metadata and load them into local database. In this case the database metadata is a kind of mirror of the MXF metadata.

Usually, when users edit any metadata (either in the MXF file or in the local database), it is desired that any associated mirror metadata (either in local database or in MXF file) can be edited synchronously or automatically. However, according to the prior art, this is impossible. The reason is, that after the metadata converting procedure (from database to MXF, or vice versa), there is no reference linking between the database metadata and the MXF metadata anymore. Thus, database metadata and MXF metadata can be only edited separately.

In order to enable editing of metadata and its mirror metadata synchronously or automatically, this invention provides a method to set up reference linking between database metadata and MXF metadata.

Figure 1:
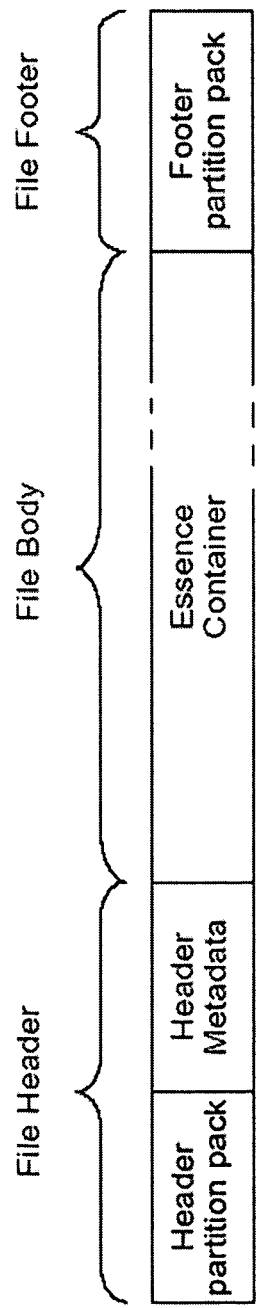
FIG. 1 the overall data structure of a simple MXF file.

As shown in FIG. 1 taken from the MXF standard like FIGS. 2 to 5, a simple MXF file normally includes a File Header, a File Body and a File Footer. The File Header is divided into a Header partition pack and a Header metadata pack. The File Body represents the Essence Container.

Figure 2:
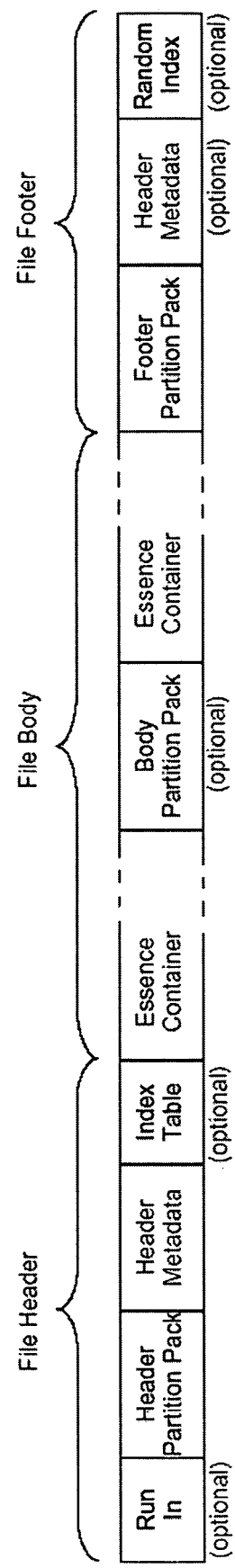
FIG. 2 an overall data structure of an MXF file with optional components.

FIG. 2 shows the overall data structure of an MXF file having some additional optional components compared to the simple MXF file of FIG. 1. Specifically, the File Header includes an optional Run In block and an optional Index Table. Furthermore, the File Body may include a Body Partition Pack and the File Footer may include a Header Metadata Pack and a Random Index Pack.

Figure 3:
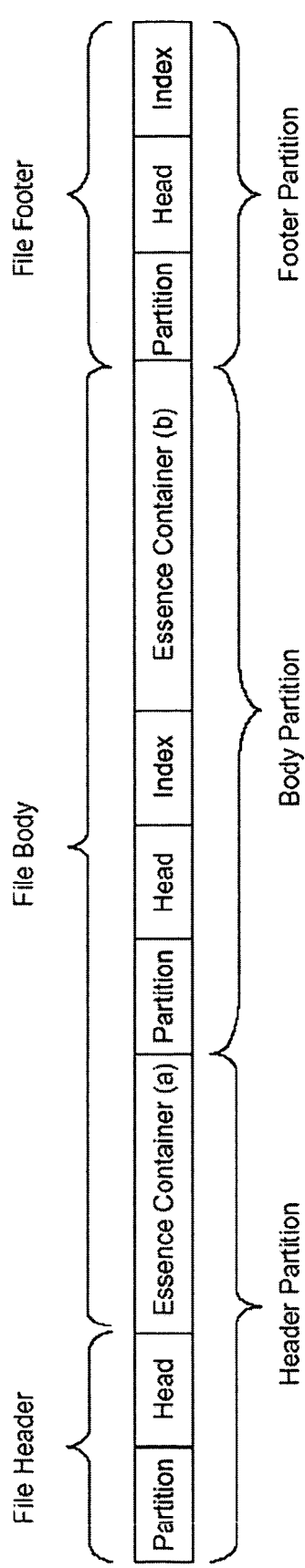
FIG. 3 the data structure of an MXF file containing one essence container.
Figure 4:
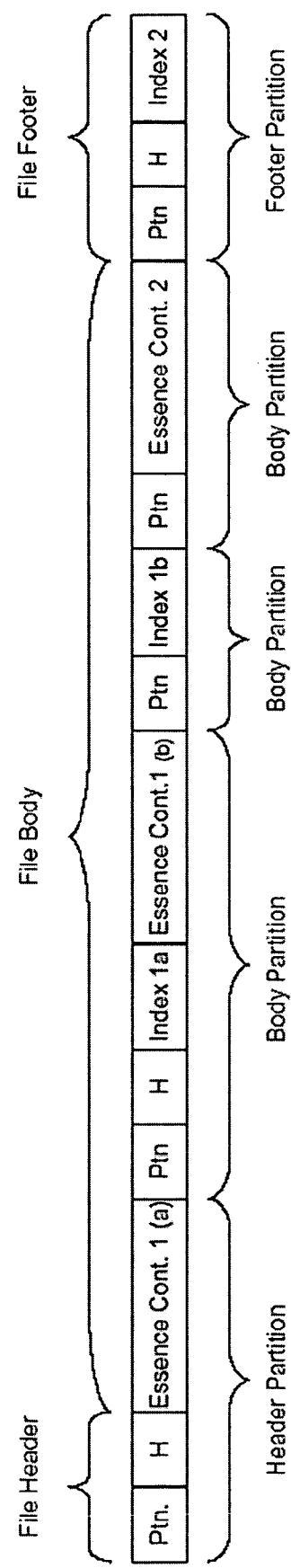
FIG. 4 the data structure of an MXF file containing two essence containers.

As shown in FIG. 3, the MXF file can further be divided into a number of partitions: one Header Partition, optional one or more Body Partitions and optional one Footer Partition. Each Partition (Ptn) may contain Header metadata H as indicated in FIG. 4. The Header Partition must contain Header metadata H. Header metadata H are optionally repeated in Body Partitions and the Footer Partition.

Figure 5:
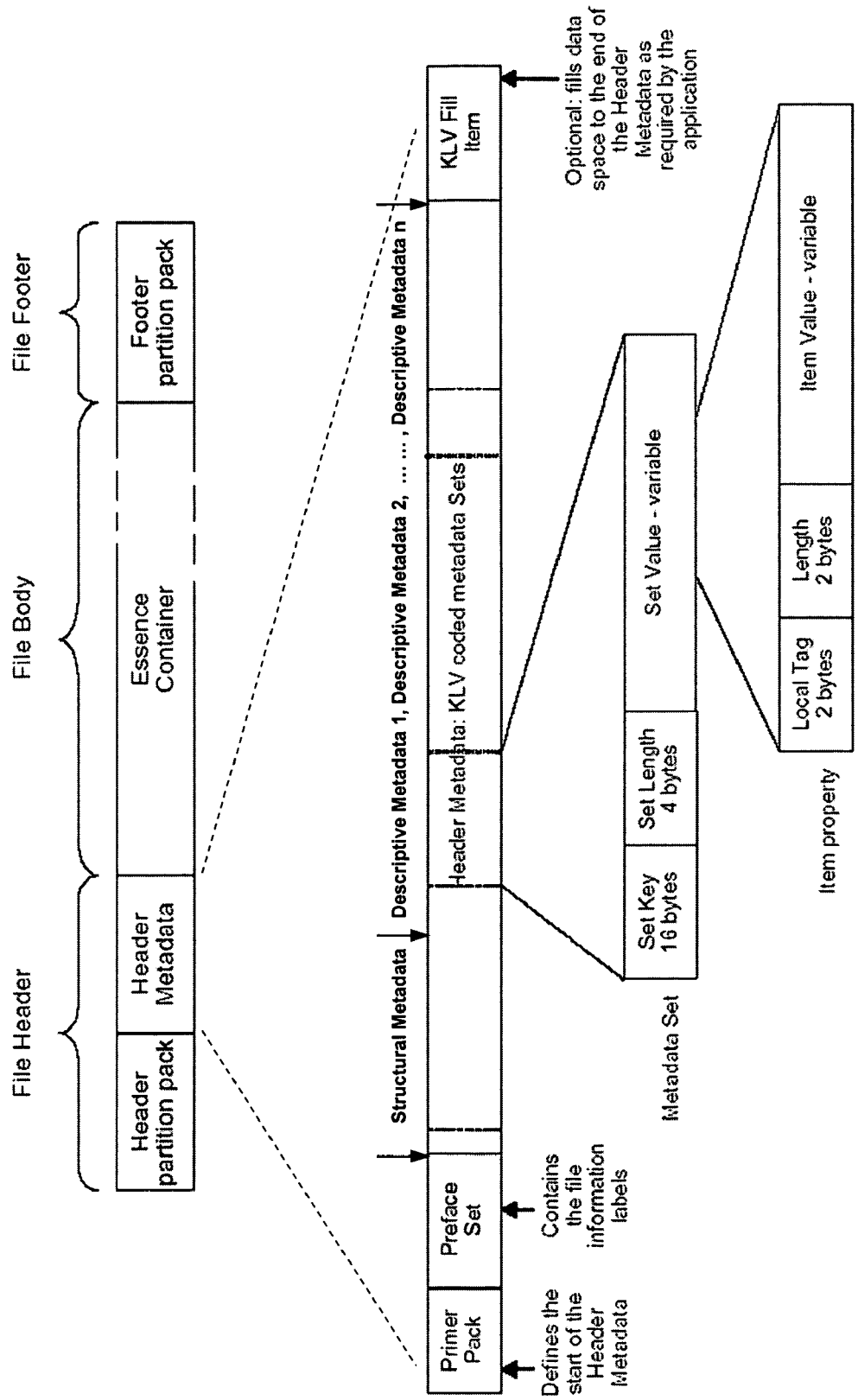
FIG. 5 a detailed structure of the metadata of an MXF file.

As shown in FIG. 5, Header MD (metadata) is split into two categories: Structural MD and Descriptive MD. The Structural MD is defined and set as a single pack, and shall occupy the first part of the Header MD. One or more Descriptive MD is defined as a "plug-in" in the Structural MD pack. There is more than one Descriptive MD block in the Header MD. In the Header MD, the Structural MD and all Descriptive MD are represented as a sequence of KLV (key length value) coded Metadata Sets. Each Metadata Set is a KLV encoded block, which contains further Value Item blocks.

When a local database metadata is converted into MXF metadata, usually it would be converted into one or more Descriptive Metadata, and encoded as KLV Metadata Set blocks of an MXF Header Metadata.

Figure 6:
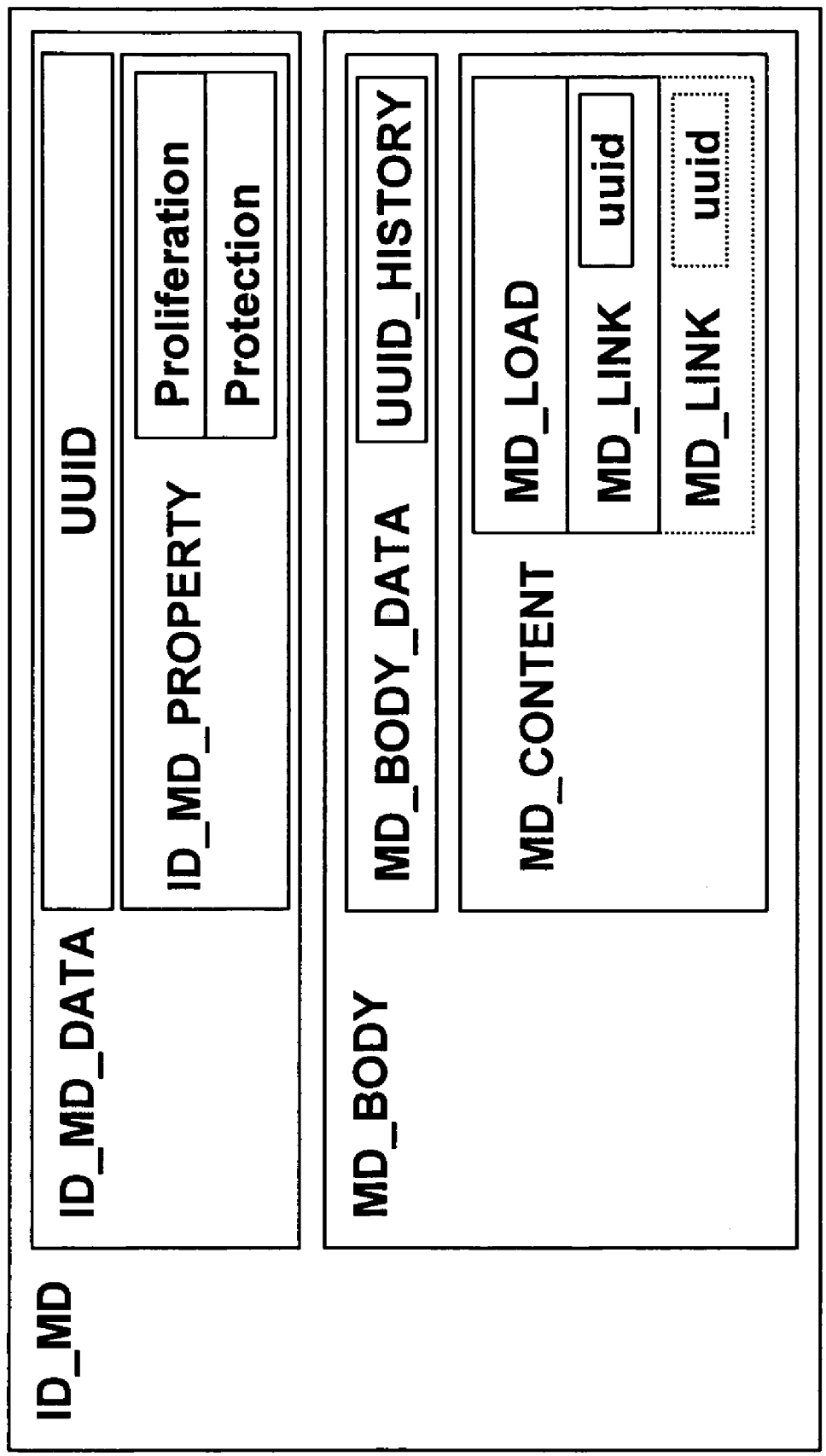
FIG. 6 the data structure of metadata in a multi-layer-format.

The local data base metadata of the present example shall be represented in the multi-layer-format introduced in EP 1 387 295 A1 as shown in FIG. 6. The innermost MD_content contains the MD_load and one or more MD_links with respective UUIDs (Universal Unique Identifier). The next layer MD_Body combines the MD_content with additional MD_Body data like history data. The comparison at this Metadata Body layer is especially suited for checking the identity of any two metadata. In the outermost identifier metadata layer (ID_MD), the MD_Body is combined with ID_MD_Data, like identifier data or other property data.

When an MXF metadata set is converted into the database metadata having multi-layer format, the descriptive message will be put in the MD_Load (compare arrow A0 in FIG. 7) and all essence linking message (essence UUID) will be put in the MD_Link. In such a way a single MXF metadata set may be converted into multiple database metadata.

The inventive linking of metadata in the multi-layer format with metadata in the MXF format will now be described in connection with FIG. 7.

When a database metadata is converted into MXF metadata set(s), or an MXF metadata set is converted into one or more database metadata, associated reference tags are automatically generated and saved in the associated database metadata or MXF metadata set, respectively.

Figure 7:
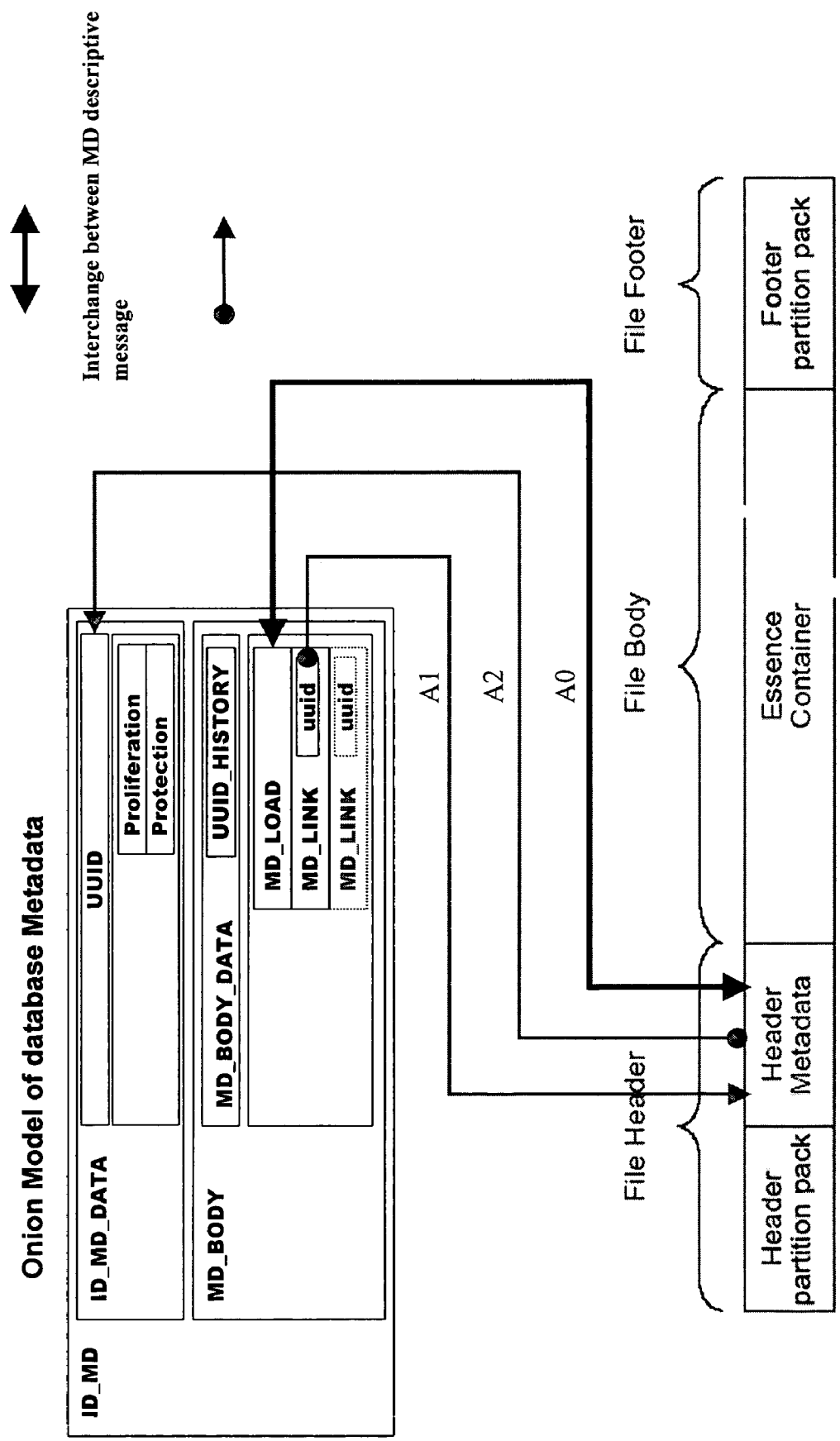
FIG. 7 the inventive linking concept between MXF metadata and metadata in multi-layer-format.

For database metadata in the multi-layer format, the UUID of the MXF file and the UID of the MXF metadata set will be written as a MD_Link into the Multi-layer structure of the database metadata (compare arrow A1 in FIG. 7). The UUID of the MXF file acts as an identifier of the MXF file. The UID of the MXF metadata set (compare FIG. 5) is used to uniquely identify the associated MXF metadata set in the MXF file. A database metadata may contain multiple (MXF) MD_Links, which point to multiple MXF metadata sets belonging to the same or different MXF files or MXF Header Metadata.

Similarly, for an MXF metadata set, a special reference item, which contains the associated database metadata UUID, will be generated in the metadata set (compare arrow A2). However, such special reference item does not yet exist in the actual MXF specification and should be created, therefore an MXF metadata set might also contain multiple reference items, which point to multiple database metadata.

If e.g. an MXF formatted file that includes MD is stored in a storage device that contains a MD handling device according to the invention, the MD handling device may automatically extract the MD from the MXF and store it in its MD database. If the device has no MD database yet, it may create one. If MD are modified in either the MXF or the database MD, e.g. a textual description relating to a file is changed, then the device may automatically update the mirror MD by copying the modified MD to the mirror MD. Therefore it uses the inventive link data to identify the mirror MD. This update may happen immediately or later, e.g. upon a specified event, like a read access to the file or similar.

In particular, the inventive device may comprise a first data providing means and a second data providing means, wherein both can provide data e.g. from the same harddisk drive (HDD), and the second data providing means retrieves data from a metadata database stored on the HDD. Further, the inventive device comprises means for detecting that first data retrieved from the first data providing means have been modified, the first data having a first format and comprising first metadata, means for extracting link information from the first metadata, wherein the link information is a reference to second metadata being stored in the metadata database, and means for updating the second metadata with the modified first metadata.

In one embodiment of the invention, also the second data contains link information comprising first link information being a reference to said first data and second link information being a reference to said first metadata within said first data, and the device further comprises means for detecting, before updating the retrieved second data, that the retrieved second data have been modified, means for determining whether the first data or the second data have been modified later, means for extracting said link information from the second data if the second data have been modified later, and means for automatically updating the first metadata referenced by said link information.

According to one aspect of the invention, a device for automatically creating metadata includes means for retrieving from a first storage medium first data in first format, the first data comprising first metadata, means for generating link information comprising first link information being a reference to said first data and second link information being a reference to said first metadata within said first data, means for converting the retrieved first metadata to second data in second format different from first format, wherein said generated link information is included in the second data, and means for storing the second data including said link information pointing to the first data and to the first metadata on the first or on a different second storage medium.

What is claimed is:

1. A method for automatically handling metadata, the method comprising:

retrieving from a first storage medium first data having a first format, the first data comprising first metadata, wherein the first format is Material Exchange Format (MXF) and the first metadata are header metadata of an MXF file retrieving from a different second storage medium second data having a different second format, the second data comprising second metadata, wherein the second format is a multilayer format providing storage position for storing linking information pointing to the first metadata;

detecting that the retrieved second data has been modified;
extracting link information from the retrieved second data;
modifying the first metadata referenced by the extracted link information;
detecting that the retrieved first data has been modified;
extracting link information from the retrieved first data;
updating the second metadata referenced by the extracted link information from the first data, wherein the updated second metadata includes modifying a descriptive message and an essence linking message;
determining which of the first data or the second data has been modified later;
if the first data has been modified later, then retrieving link information from the first metadata, wherein the retrieved link information is a reference to the second data and points to an identifier element in the multilayer format, and updating the second data referenced by the retrieved link information with the modified first metadata; and if the second data have been modified later, then retrieving link information that is a reference to the first data, and updating the first data referenced by the retrieved link information that is a reference to the first data, wherein the link information of the second data comprise first link information being a reference to the first data and second link information being a reference to the first metadata within the first data.

2. The method according to claim 1, wherein the first metadata is updated by referencing to link information.

3. Device for automatically handling metadata, the device comprising:

a storage medium for storing instructions that are executed by a computer for:

retrieving from a first storage medium first data having a first format, the first data comprising first metadata. wherein the first format is Material Exchange Format (MXF) and the first metadata are header metadata of an MXF file;

retrieving from a different second storage medium second data having a different second format, the second data comprising second metadata. wherein the second format is a multilayer format providing storage position for storing linking information pointing to the first metadata;

detecting that the retrieved second data has been modified;
extracting link information from the retrieved second data;
modifying the first metadata referenced by the extracted link information;
detecting that the retrieved first data has been modified;
extracting link information from the retrieved first data;
updating the second metadata referenced by the extracted link information from the first data, wherein the updated second metadata includes modifying a descriptive message and an essence linking message;
determining which of the first data or the second data has been modified later;
if the first data has been modified later, then retrieving link information from the first metadata. wherein the retrieved link information is a reference to the second data and points to an identifier element in the multilayer format, and updating the second data referenced by the retrieved link information with the modified first metadata; and if the second data have been modified later, then retrieving link information that is a reference to the first data, and updating the first data referenced by the retrieved link information that is a reference to the first data, wherein the link information of the second data comprise first link information being a reference to the first data and second link information being a reference to the first metadata within the first data.

4. The device according to claim 3, wherein the first metadata is updated by referencing to link information.

* * * * *